United States Patent
Seok et al.

(10) Patent No.: US 10,196,835 B2
(45) Date of Patent: Feb. 5, 2019

(54) PATTERNED LOCKING KEY, KEY BOX COMBINED THEREWITH, LOCKING UNIT HAVING THE PATTERNED LOCKING KEY, AND MANUFACTURING METHOD OF THE PATTERNED LOCKING KEY

(71) Applicant: HYUNDAI MOTOR COMPANY, Seoul (KR)

(72) Inventors: Donghee Seok, Seoul (KR); Gideok Kwon, Seoul (KR); Jong Bok Lee, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/377,246

(22) Filed: Dec. 13, 2016

(65) Prior Publication Data

US 2018/0087291 A1    Mar. 29, 2018

(30) Foreign Application Priority Data

Sep. 23, 2016    (KR) .................. 10-2016-0121924

(51) Int. Cl.

| E05B 35/00 | (2006.01) |
|---|---|
| B23K 26/362 | (2014.01) |
| B60R 25/021 | (2013.01) |
| E05B 19/24 | (2006.01) |
| E05B 45/06 | (2006.01) |
| E05B 49/00 | (2006.01) |
| G07C 9/00 | (2006.01) |
| B60R 25/104 | (2013.01) |
| B60R 25/20 | (2013.01) |

(52) U.S. Cl.
CPC .......... *E05B 35/001* (2013.01); *B23K 26/362* (2013.01); *B60R 25/021* (2013.01); *E05B 19/24* (2013.01); *E05B 45/06* (2013.01); *E05B 49/002* (2013.01); *G07C 9/00174* (2013.01); *G07C 9/00182* (2013.01); *B60R 25/104* (2013.01); *B60R 25/2063* (2013.01); *G07C 9/00706* (2013.01)

(58) Field of Classification Search
CPC ...... E05B 35/001; E05B 19/24; E05B 49/002; B23K 26/362; G06K 19/06037
See application file for complete search history.

(56) References Cited

U.S. PATENT DOCUMENTS

| 5,132,661 A * | 7/1992 | Pinnow | E05B 49/006 340/5.28 |
|---|---|---|---|
| 5,838,232 A * | 11/1998 | Kim | E05B 49/006 340/542 |
| 6,552,650 B1 * | 4/2003 | Gokcebay | E05B 47/0611 340/5.65 |

(Continued)

FOREIGN PATENT DOCUMENTS

| JP | 08-123922 A | 5/1996 |
|---|---|---|
| JP | 2002-276216 A | 9/2002 |

(Continued)

*Primary Examiner* — Thomas Alunkal
(74) *Attorney, Agent, or Firm* — McDermott Will & Emery LLP (57) ABSTRACT

A locking key for changing a locked state by being inserted into a key box includes a first base including a metal complex and in which a first pattern groove is formed, and a first pattern provided in the first pattern groove and including a conductive material.

12 Claims, 11 Drawing Sheets

(56) References Cited

U.S. PATENT DOCUMENTS

| | | | | |
|---|---|---|---|---|
| 9,418,327 | B1* | 8/2016 | Briggs | G07C 9/00658 |
| 2010/0195916 | A1* | 8/2010 | Blondiaux | G06K 19/086 |
| | | | | 382/209 |
| 2012/0011907 | A1* | 1/2012 | Sprenger | G07C 9/00111 |
| | | | | 70/279.1 |
| 2012/0168506 | A1* | 7/2012 | Ruehrmair | G06F 21/73 |
| | | | | 235/454 |

FOREIGN PATENT DOCUMENTS

| | | |
|---|---|---|
| KR | 20-1985-0001467 Y1 | 7/1985 |
| KR | 10-0282743 B1 | 2/2001 |
| KR | 10-2010-0062258 A | 6/2010 |
| KR | 10-1584246 B1 | 1/2016 |
| WO | 2014/177918 A1 | 11/2014 |

* cited by examiner

PATTERNED LOCKING KEY, KEY BOX COMBINED THEREWITH, LOCKING UNIT HAVING THE PATTERNED LOCKING KEY, AND MANUFACTURING METHOD OF THE PATTERNED LOCKING KEY

CROSS-REFERENCE TO RELATED APPLICATION(S)

This application claims the benefit of priority to Korean Patent Application No. 10-2016-0121924, filed on Sep. 23, 2016 with the Korean Intellectual Property Office, the disclosure of which is incorporated herein by reference.

TECHNICAL FIELD

Embodiments of the present disclosure relate to a patterned locking key, a key box combined therewith, a locking unit having the patterned locking key and a manufacturing method thereof, and more particularly, to a patterned locking key in which a pattern is formed by using laser processing, a key box combined with the locking key, a locking unit having the same, and a manufacturing method thereof.

BACKGROUND

Common technologies related to a key have been expanded from a hard key to a wireless key. For example, in the vehicle field, due to the development of technology related to keys, it may be possible to control locking and unlocking the vehicle by transmitting a wireless signal, by using a smart key or a remote controller.

However, a hard key is still provided to a user. In a case of a user using the smart key, the user needs to use the hard key when a battery of the smart key is run out or when the user locks a glove box. In addition, in a case of a user using the remote controller, the user needs to use the hard key when starting an ignition.

The manufacturer of the vehicle may enhance vehicle security by adding an immobilizer function to the hard key according to vehicle options. However, there are several problems in that the immobilizer function is only used for the ignition and when the user loses the immobilizer key, a key box is required to be changed.

A wireless key may process an internal ID code and custom bit by using 56 bit data and secure the security thereof. However, the hard key may be manufactured by using a cutting process to have a unique feature of the hard key itself, and thus there is a risk of manufacturing a second, and identical, hard key. In addition, due to the limitations of the physical size, it may be difficult to make a detailed key pattern. Thus, it is possible that a duplication of the key may be performed.

SUMMARY

Therefore, it is an aspect of the present disclosure to provide a locking key, a key box combined therewith, a locking unit having the same and a manufacturing method thereof that can enhance the security of the locking unit by forming a pattern of the locking key and/or the locking box by using Laser Direction Structure (LDS).

Additional aspects of the present disclosure will be set forth in part in the description which follows and, in part, will be obvious from the description, or may be learned by practice of the present disclosure.

In some aspects, the present disclosure provides a locking key for changing a locked state by being inserted into a key box or changing an unlocked state by the locking key being removed from the key box, comprising: a first base including a metal complex and in which a first pattern groove is formed; and a first pattern provided in the first pattern groove and including a conductive material.

The first base comprises a resin including one or more of Polycarbonate (PC), Polyamide (PA) and acrylonitrile-butadiene-styrene copolymer (ABS), and a metal oxide including one or more of Mg, Cr, Cu, Ba, Fe, Ti and Al.

In some aspects, the present disclosure provides a key box for changing a locked state by a locking key being inserted into the key box or changing an unlocked state by the locking key being removed from the key box, comprising an insertion hole into which the locking key is inserted; a second base laminated on one surface of the insertion hole, the second base including a metal complex, and the second base including a second pattern groove formed thereon; and a second pattern provided in the second pattern groove and including a conductive material.

The second base comprises a resin including one or more of Polycarbonate (PC), Polyamide (PA) and acrylonitrile-butadiene-styrene copolymer (ABS), and a metal oxide including one or more of Mg, Cr, Cu, Ba, Fe, Ti and Al.

A controller may be electrically connected to the second pattern, wherein the controller receives an input of a signal related to capacitance of the second pattern and determines whether the locking key is registered or not according to the signal.

In some aspects, the present disclosure provides a locking unit for changing a locked state by a locking key being inserted into a key box or changing an unlocked state by the locking key being removed from the key box, comprising a first pattern including a conductive material provided on the locking key; wherein the key box is provided with an insertion hole into which the locking key is inserted, a second pattern including a conductive material, and a controller electrically connected to the second pattern, wherein the controller receives an input of a signal related to a capacitance or to a frequency between the first pattern and the second pattern, and determines whether the locking key is registered or not based on the signal.

The locking key may further comprise a first base including a metal complex and in which a first pattern groove is formed, wherein the first pattern is provided in the first pattern groove.

The key box may further comprise a second base laminated on one surface of the insertion hole, the second base including a metal complex, the second base including a second pattern groove formed thereon, an wherein the second pattern is provided in the second pattern groove.

The locking unit may include a guide unit for guiding the locking key so that the locking key is inserted into the insertion hole in a predetermined direction.

The guide unit comprises a guide protrusion protruded on one surface of any one of the locking key or the insertion hole, and the guide unit includes a guide groove recessed on one surface of the other of the locking key or the insertion hole, wherein the guide protrusion is guided along the guide groove.

The locking unit may further comprise a stop unit for stopping the locking key so that the locking key is inserted into the insertion hole at a predetermined depth.

The second pattern is provided in a unique pattern and the first pattern is provided in a variety of patterns, wherein the locking unit has a unique frequency pattern when the locking key having any one of the plurality of first patterns is inserted into the key box having the second pattern.

The controller determines that the locking key corresponds to the key box when a frequency pattern, which is output when the locking key is inserted into the key box, is identical to the unique frequency pattern.

In some aspects, the present disclosure provides a manufacturing method of a locking unit for changing a locked state by a locking key being inserted into a key box or changing an unlocked state by the locking key being removed from the key box, comprising: manufacturing the locking key, including: providing a first base including a metal oxide; forming a first pattern groove by irradiating laser beams to one surface of the first base; and forming a first pattern including a conductive material by a plating process or a deposition process on the first pattern groove; and manufacturing the key box, including: providing a second base configured to include a metal oxide and provided with an insertion hole into which the locking key is inserted; forming a second pattern groove by irradiating laser beams to one surface of the second base; and forming a second pattern including a conductive material by a plating process or a deposition process on the second pattern groove, wherein the second pattern is provided in a unique pattern and the first pattern is provided in a variety of patterns.

BRIEF DESCRIPTION OF THE DRAWINGS

These and/or other aspects of the disclosure will become apparent and more readily appreciated from the following description of exemplary embodiments, taken in conjunction with the accompanying drawings of which.

DETAILED DESCRIPTION

The present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure.

According to some embodiments of the present disclosure, a locking unit 10 may include a locking key 200 inserted into a key box 100 to release a locking state and the key box 100 to which the locking key 200 is inserted.

According to some embodiments of the present disclosure, the locking key 200 and the key box 100 may be applied to a variety of places and objects. However, for convenience of the description, the locking key 200 and the key box 100 used for a vehicle will be described as a non-limiting example.

A structure of the patterned locking key 200 and the key box 100 combined with the locking key 200 will be described with reference to FIGS. 1 to 4.

Figure 1:
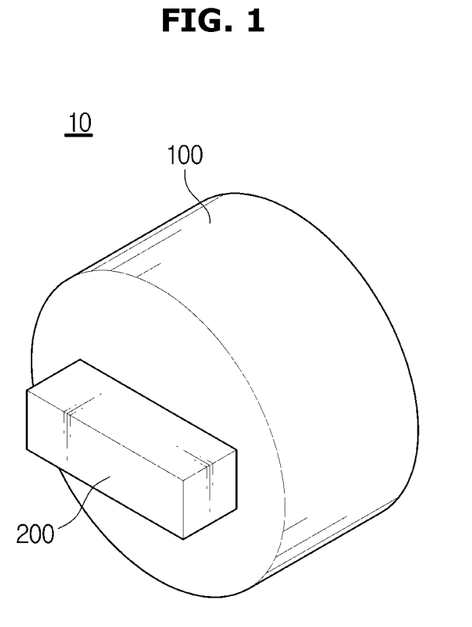
FIG. 1 is a perspective view illustrating a state in which a locking key and a key box are removably combined with each other in accordance with exemplary embodiments of the present disclosure.
Figure 2:
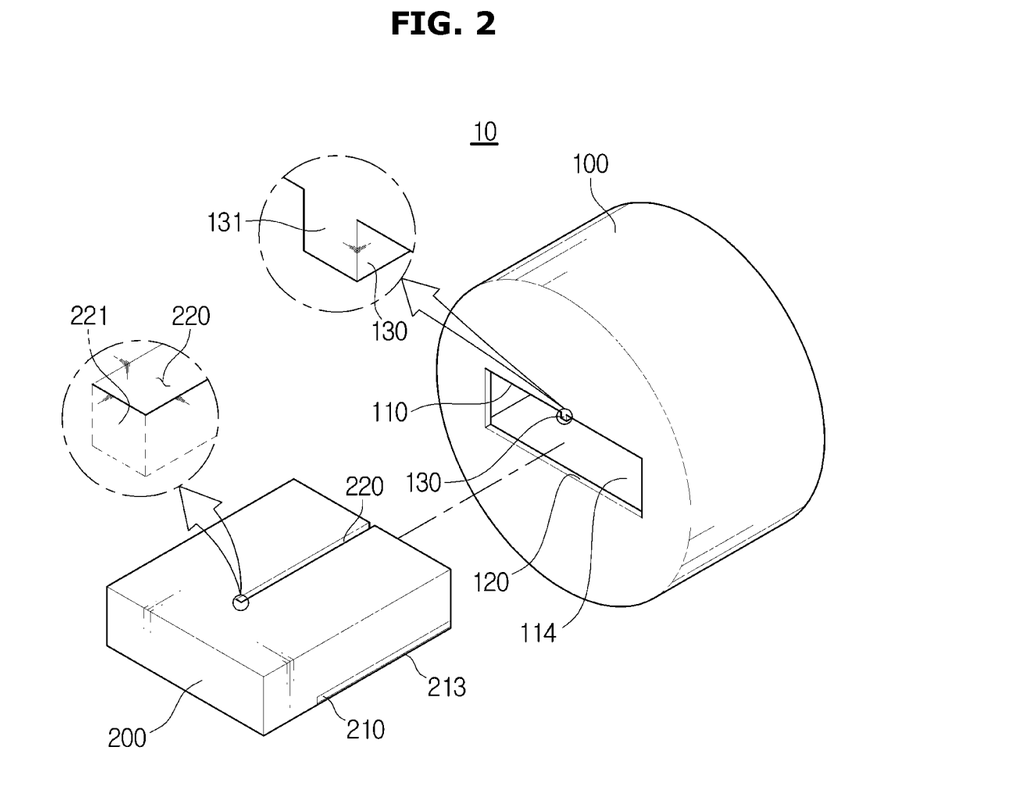
FIG. 2 is a perspective view illustrating a state in which a locking key and a key box are separated from each other according to exemplary embodiments of the present disclosure.
Figure 3:
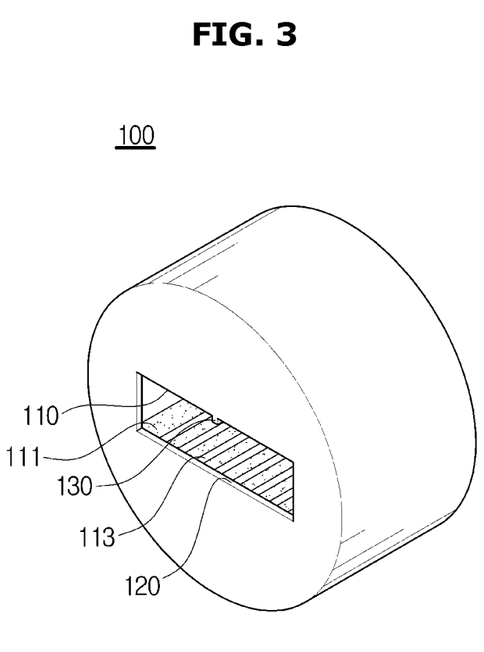
FIG. 3 is a perspective view illustrating a key box according to exemplary embodiments of the present disclosure.
Figure 4:
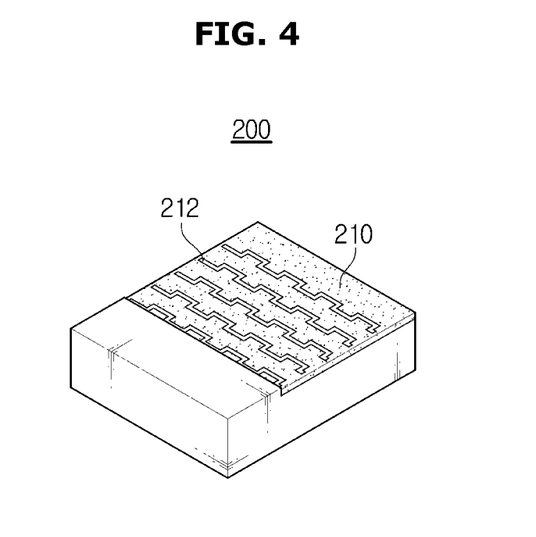
FIG. 4 is a perspective view illustrating a locking key according to exemplary embodiments of the present disclosure.

FIG. 1 is a perspective view illustrating a state in which a locking key 200 and a key box 100 are combined with each other in accordance with exemplary embodiments of the present disclosure, and FIG. 2 is a perspective view illustrating a state in which a locking key 200 and a key box 100 are separated from each other according to exemplary embodiments of the present disclosure. FIG. 3 is a perspective view illustrating a key box according to exemplary embodiments of the present disclosure, and FIG. 4 is a perspective view illustrating a locking key according to exemplary embodiments of the present disclosure. Particularly, FIGS. 3 and 4 illustrate that a coating layer 114 and 213 are removed to show a first pattern 113 and a second pattern 212.

A configuration for mounting the key box 100 is omitted in the drawings. For example, the key box 100 may be installed in front of a driver seat, particularly disposed adjacent to a steering wheel. However, the key box 100 may be installed at a variety of positions, as needed.

The key box 100 may include an insertion hole 110 to which the locking key 200 is inserted. The insertion hole 110 may have a shape corresponding to the shape of the locking key 200. For example, when a cross section of the locking key 200 is formed in a rectangular shape, a cross section of the insertion hole 110 may have a rectangular shape. Alternatively, when a cross section of the locking key 200 is formed in a circular shape, a cross section of the insertion hole 110 may have a circular shape.

A height and width of the insertion hole 110 may be larger than a height and width of the locking key 200. For example, after the locking key 200 is inserted into the insertion hole 110, a space may be provided between an outer surface of the locking key 200 and an inner surface of the insertion hole 110.

For this, a spacer 120 may be provided on one surface of the locking key 200 and/or one surface of the insertion hole 110. The spacer 120 may maintain a certain distance between the locking key 200 and the key box 100. For example, the spacer 120 may be implemented by a plurality of protrusions protruded from an inner surface of the insertion hole 110.

Referring to the drawings, on an entry of the insertion hole 110, the spacer 120 protruding toward the inside may be formed. An internal area that is divided by the spacer 120 may be provided to be approximately identical to an appearance of the locking key 200. However, a tolerance may be provided so that the locking key 200 is smoothly inserted.

The spacer 120 may maintain a certain distance between the locking key 200 and the inner surface of the insertion hole 110 when the locking key 200 is inserted into the key box 100.

The locking key 200 may be inserted into the insertion hole 110 in a certain direction. That is, the key box 100 may allow the locking key 200 to be inserted thereto in only a predetermined direction.

For this, a guide 130 and 220 may be provided on one surface of the locking key 200 and/or one surface of the insertion hole 110. The guide 130 and 220 may allow the locking key 200 to be inserted into the key box 100 in the predetermined direction, but the guide 130 and 220 may interrupt the insertion of the locking key 200 in other direction. Particularly, when the locking key 200 has a circular shape, the guide may be required.

The guide 130 and 220 may allow a direction in which the locking key 200 is inserted into the insertion hole 110, to be a sole direction. For example, when the cross section of the locking key 200 is a rectangular shape, the locking key 200 may be inserted into the insertion hole 110 in two directions; a predetermined direction and a direction that is inverted by 180 degree from the predetermined direction. When the locking key 200 is inserted into the insertion hole 110 in the predetermined direction, the locking key 200 may be inserted into the inside of the insertion hole 110 along the guide. However, when the locking key 200 is inserted into the insertion hole 110 in a state in which the locking key 200 is inverted by 180 degrees, the guide may interrupt the insertion of the locking key 200.

Referring to the drawings, a guide protrusion 130 extended in an insertion direction may be formed on one surface of the insertion hole 110, and a guide groove 220 extended in an insertion direction may be formed on one surface of the locking key 200. That is, the locking key 200 may be inserted in a direction in which the guide groove 220 and the guide protrusion 130 are coupled to each other.

In another example, when the cross section of the locking key 200 is a circular shape, the locking key 200 may be inserted into the insertion hole 110 in any direction unless an additional guide is not provided. To prevent this, the guide protrusion 130 may be formed on an outer surface of the locking key 200 and the guide groove 220 configured to guide the guide protrusion 130 of the locking key 200 may be formed on the inner surface of the insertion hole 110. In this case, when the locking key 200 is inserted into the insertion hole 110 in only the predetermined direction, the protrusion may be inserted along the guide groove 220 and thus the locking key 200 may be inserted into the insertion hole 110 in the sole direction.

Alternatively, the guide 130 and 220 may allow the locking key 200 to be inserted into the insertion hole 110 in a plurality of directions. For example, when the cross section of the locking key 200 is a rectangular shape, the locking key 200 may be inserted into the insertion hole 110 along the guide although the locking key 200 is inverted by 180 degrees.

For another example, when the cross section of the locking key 200 is a circular shape, a single pair of the guide protrusion 130 may be provided in directions facing to each other, on the outer surface of the locking key 200, and a single pair of the guide groove 220 guiding the guide protrusion 130 of the locking key 200 may be provided in directions facing to each other, on the inner surface of the insertion hole 110. In this case, when the locking key 200 is inserted into the insertion hole 110 in only the two directions; the predetermined direction and the direction that is inverted by 180 degrees from the predetermined direction, the guide protrusion 130 may be inserted along the guide groove 220, and thus the locking key 200 may be inserted into the insertion hole 110 in only the two directions.

The locking key 200 may be inserted into the key box 100 at a certain depth. In a state in which the locking key 200 is inserted by the certain depth, a process of determining whether the locking key 200 inserted into the key box 100 is predetermined may be continued.

For this, the locking key 200 or the key box 100 may include a stop unit 221. Referring to the drawings, the stop unit 221 may be provided on an end portion of the guide groove 220 of the locking key 200. The stop unit 221 may be formed to be a shape of step in which the guide groove 220 is ended. The locking key 200 may not move forward anymore when the stop unit 221 makes contact with an end part 131 of the guide protrusion 130. That is, a position, in which the stop unit 221 makes contact with the end part 131 of the guide protrusion 130, may correspond to a predetermined position in which the locking key 200 is inserted into the key box 100.

Meanwhile, a base 111 may be laminated on one surface of the insertion hole 110, a pattern groove 112 may be formed on one surface of the base 111, the pattern groove 112 may be filled with a first pattern 113, and a coating layer 114 may be laminated on the one surface of the base 111 in which the first pattern 113 is formed.

Further, a base 210 may be laminated on one surface of the locking key 200, a pattern groove 211 may be formed on one surface of the base 210, the pattern groove 211 may be filled with a second pattern 212, and a coating layer 213 may be laminated on the one surface of the base 210 in which the second pattern 212 is formed.

Meanwhile, the base 111 and 210, the pattern groove 112 and 211, the first and second pattern 113 and 212 and the coating layer 114 and 213 will be described later in FIG. 6 below.

An action between the first pattern 113 and the second pattern 212 will be described with reference to FIG. 5.

Figure 5:
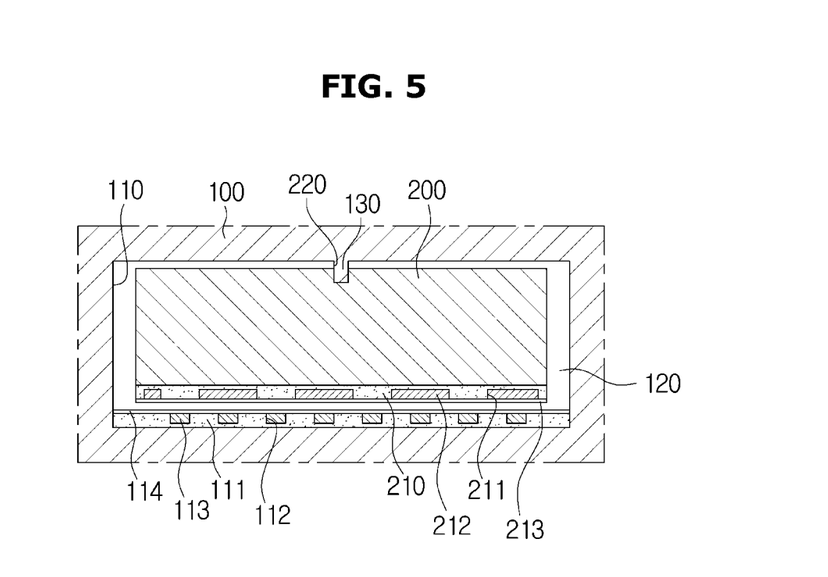
FIG. 5 is a cross sectional view illustrating a first pattern and a second pattern in a state in which a locking key is combined with a key box according to exemplary embodiments of the present disclosure.

FIG. 5 is a cross sectional view illustrating a first pattern 113 and a second pattern 212 in a state in which a locking key 200 is combined with a key box 100 according to exemplary embodiments of the present disclosure.

The first pattern 113 may be formed on the one surface of the insertion hole 110, and the second pattern 212 may be formed on the one surface of the locking key 200. For example, Tx pattern may be used as the first pattern 113 and Rx pattern may be used as the second pattern 212.

The first pattern 113 and the second pattern 212 may be a pattern in which a regular pattern element is repeated or may be an irregular pattern. The drawings illustrate that the shape of the first pattern 113 and the second pattern 212 is simplified, but the shape and the number of the patterns may vary.

The second pattern 212 may be connected to a controller (not shown) by wiring. The second pattern 212 may transmit a signal to the controller by acting with the first pattern 113.

The controller may determine whether the locking key 200 is registered in the key box 100 by analyzing a signal generated by an action between the first pattern 113 and the second pattern 212. When it is determined that the locking key 200 is registered in the key box 100, the controller may execute a predetermined command. For example, the controller may activate electronic control means of the vehicle and turn on lights on an instrument panel of the vehicle. When it is determined that the locking key 200 is not registered in the key box 100, the controller may execute a predetermined alarm. For example, the controller may output a warning sound and display a warning sign on the instrument panel.

The second pattern 212 may be provided in a universal pattern and the first pattern 113 may be provided in a unique pattern. Despite using the second pattern 212 provided in the universal pattern, a signal generated by the action with the first pattern 113 provided in the unique pattern may have a unique value. Therefore, the controller may determine whether the locking key 200 inserted into the key box 100 is registered or not.

The controller may analyze the signal generated by the action between the first pattern 113 and the second pattern 212 when the locking key 200 is inserted into the insertion hole 110 by, or at, the predetermined depth. For this, the key box 100 may further include a sensor unit (not shown) configured to determine whether the locking key 200 is inserted into the insertion hole 110 by, or at, the predetermined depth or not. In this case, when a signal is received from the sensor unit, the controller may determine that the locking key 200 is inserted into the insertion hole 110 by the predetermined depth, and then analyze the signal generated by the action between the first pattern 113 and the second pattern 212.

The controller may receive an input of a signal related to capacitance and/or a signal related to a frequency of the second pattern 212. When the locking key 200 is inserted into the insertion hole 110 by the predetermined depth, a value of the capacitance of the second pattern 212 may be changed by the first pattern 113. For example, a signal related to the capacitance of the second pattern 212 may be changed according to mutual capacitance between the first pattern 113 and the second pattern 212. When the locking key 200 is inserted into the insertion hole 110 by the predetermined depth, a frequency of an electronic signal flowing in the second pattern 212 may be changed by the first pattern 113.

The controller may determine whether the locking key 200 is registered in the key box 100 by analyzing the signal related to changed capacitance and frequency of the second pattern 212. When a locking key 200 having a pattern different from the first pattern 113 is inserted, a changed capacitance value or a changed frequency of the second pattern 212 may be different from a case in which the first pattern 113 is inserted.

For example, as the first pattern 113 provided in the unique pattern is inserted into the second pattern 212 provided in the universal pattern, capacitance and a frequency between the first pattern 113 and then the second pattern 212 may be formed and the controller may determine whether the locking key 200 is registered by using the capacitance signal or the frequency signal.

The controller may store information related to a unique frequency channel generated according to an interaction between the unique first pattern 113 of the registered locking key 200 and the common second pattern 212, and determine that the locking key 200 is registered when the frequency channel, which is generated by the inserted the locking key 200, is identical to the stored unique frequency channel.

A process of forming a pattern 330 in the locking key 200 and the key box 100 will be described with reference to FIGS. 6 to 11.

Hereinafter a description will be described without distinguishing between the locking key 200 and the key box 100 and without distinguishing between the first pattern 113 and the second pattern 212. That is, the following description may correspond to a process of forming the first pattern 113 on the locking key 200 and a process of forming the second pattern 212 on the key box 100.

Figure 6:
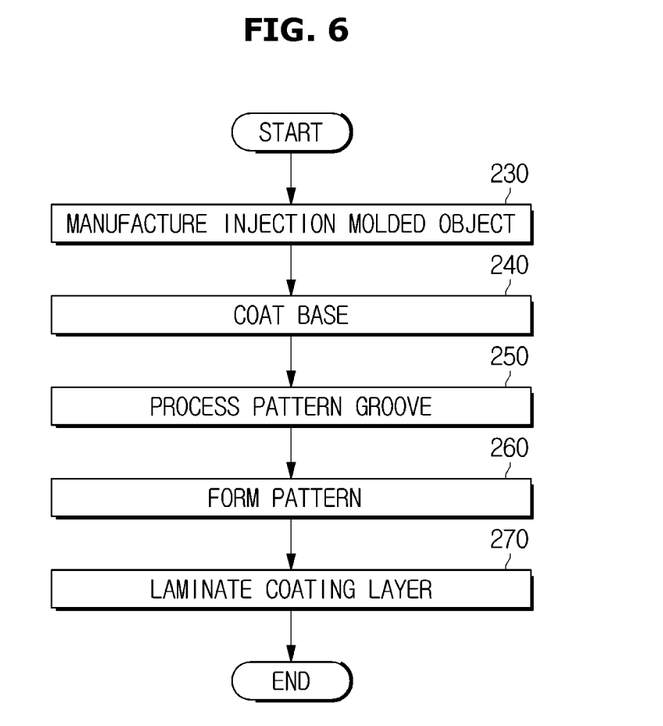
FIG. 6 is a flowchart illustrating a process of forming a pattern on a locking key and a key box according to exemplary embodiments of the present disclosure.

FIG. 6 is a flowchart illustrating a process of forming the pattern 113 and 212 on the locking key 200 and the key box 100.

Referring to FIG. 6, the pattern 113 and 212 may be formed on the locking key 200 or the key box 100 by a process of manufacturing an injection molded object having an appearance of the locking key 200 or the key box 100 (230), coating one surface of the injection molded object with a base (240), forming a pattern groove on the one surface of the base (250), forming a pattern in the pattern groove (260), and laminating a coating layer on the one surface of the base on which the pattern is formed (270).

For example, the pattern 330 may be formed on the base 310 by using a LDS (Laser Directing Structure) method. The LDS method represents a method in which forming a support material by using a material including a metal complex that is non-conductive and chemically stable, exposing a metal seed by breaking a chemical bonding of the metal complex by exposing a part of the support material to a laser, e.g. UV (Ultra Violet) laser or excimer laser, and then forming a conductive structure on a laser exposed part of the support material by metalizing the support material are performed. The LDC method is disclosed in Korea Patent Registration Publication No 374667, Korea Patent Laid-Open Publication No. 2001-40872 and No. 2004-21614, and the corresponding disclosures are herein incorporated by reference.

The pattern 330 may be a conductive material, e.g. a metal. Copper (Cu) may be used as the pattern 330 in consideration of the conductivity and economic efficiency. In addition, anti-oxidation treatment may be performed by nickel (Ni) plating. However, it is also possible to use gold (Au) instead of copper to increase the conductivity.

The base 310 may be laminated on one surface of a base material 300. For example, the base 310 may be laminated on the one surface of the base material 300 by a coating process.

The base 310 may include a metal complex. For example, the base 310 may be a complex including resin and a metal oxide. The resin may include any one or more of Polycarbonate (PC), Polyamide (PA) and acrylonitrile-butadiene-styrene copolymer (ABS), and the metal oxide may include any one or more of Mg, Cr, Cu, Ba, Fe, Ti and Al.

Meanwhile, the base 310 may be provided to be coated on one surface of the base material 300 formed of a variety of materials. The base material 300 may include resin, glass or leather. A surface of the base material 300 may be stiff and elastic. The base material 300 may be rigid (i.e., hardened so not to be deformable or deformed) or flexible (i.e., deformable). Further, the base material 300 may be formed by the injection molding method. For example, the base material 300 may be injected to have a variety of shapes and the base 310 including a metal oxide may be coated on an upper surface or a bottom surface of the base material 300.

In some embodiments, the base 310 may be integrally formed with the base material 300, unlike in the drawings. In this case, the base material 300 may include a metal complex.

On one surface of the base 310, a pattern groove 320 accommodating the pattern 330 may be formed. As a result, the pattern 330 may be provided inside of the pattern groove 320.

The pattern groove 320 may be formed by irradiating laser beams to the one surface of the base 310. In this time, the base 310 may be reduced to a metal by a heat generated during when the groove is formed, and a part that is reduced to the metal may form a metal seed in the pattern groove 320.

The pattern 330 may be formed by being plated on the pattern groove 320. A process of plating on the metal seed may employ well-known plating techniques and thus a detailed description thereof will be omitted. The pattern 330 may be formed by a deposition process. Alternatively, the pattern 330 may formed by a combination of the plating process and the deposition process. Hereinafter, it is assumed that the pattern 330 is formed by the plating process.

The base 310 may have a curved surface or a bent surface according to the shape of the base material 300. For example, one surface of the base 310 may have a shape of a part of a spherical surface. The pattern groove 320 may be formed on a curved surface of the base 310. In this time, since the pattern groove 320 is formed by the laser, the pattern groove 320 may have a complicated shape regardless of the shape of the base 310.

The pattern 330 may be plated on the pattern groove 320. In this time, due to the properties of the plating process, the pattern 330 may be plated regardless of the shape of the pattern groove 320, and the pattern 330 may be easily plated, even though the pattern groove 320 is not provided in a straight line or a plane surface.

Hereinafter, a method of forming the pattern 330 will be described.

Figure 7:
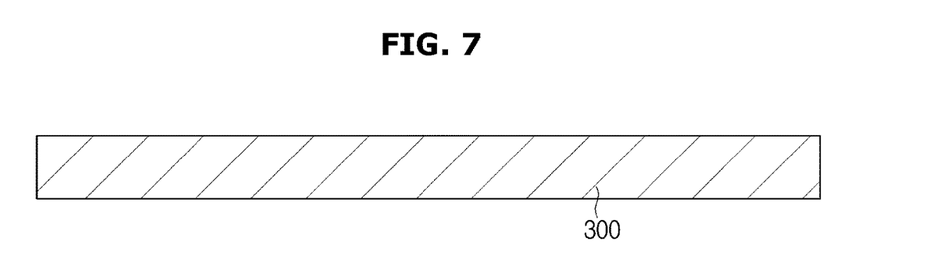
FIG. 7 is a view illustrating a process of preparing a base material according to exemplary embodiments of the present disclosure.
Figure 8:
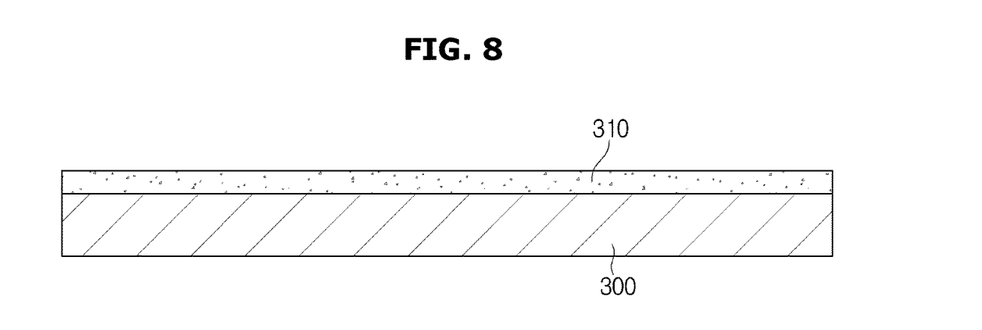
FIG. 8 is a view illustrating a process of laminating a base according to exemplary embodiments of the present disclosure.
Figure 9:
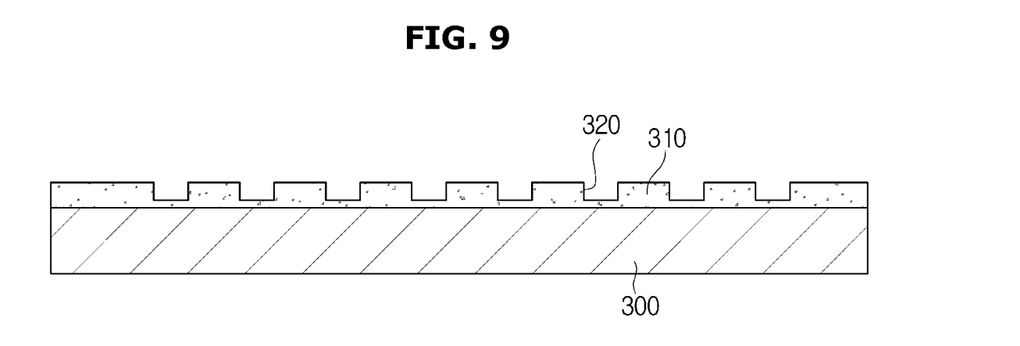
FIG. 9 is a view illustrating a process of processing a pattern groove according to exemplary embodiments of the present disclosure.
Figure 10:
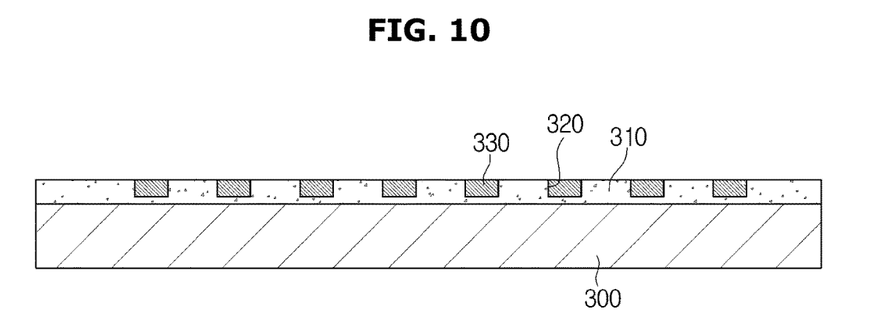
FIG. 10 is a view illustrating a process of forming a pattern according to exemplary embodiments of the present disclosure.
Figure 11:
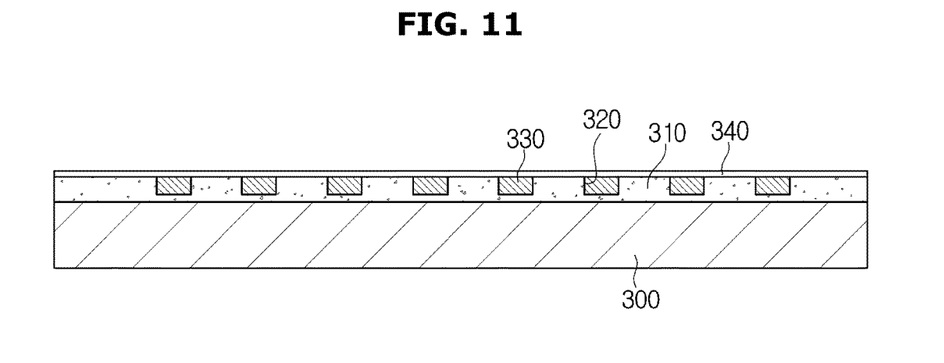
FIG. 11 is a view illustrating a process of laminating a coating layer according to exemplary embodiments of the present disclosure.

FIG. 7 is a view illustrating a process of preparing a base material 300 according to exemplary embodiments of the present disclosure, FIG. 8 is a view illustrating a process of laminating a base 310 according to exemplary embodiments of the present disclosure, FIG. 9 is a view illustrating a process of processing a pattern groove 320 according to exemplary embodiments of the present disclosure, FIG. 10 is a view illustrating a process of forming a pattern 330 according to exemplary embodiments of the present disclosure, and FIG. 11 is a view illustrating a process of laminating a coating layer 340 according to exemplary embodiments of the present disclosure.

Referring to FIG. 7, the base material 300 may be provided. The base material 300 may correspond to one surface of the locking key 200 or one surface of an accommodation hole of the key box 100. The base material 300 may be provided by the injection process.

Referring to FIG. 8, the base 310 may be laminated on one surface of the base material 300. The base 310 may include a metal complex. For example, the base 310 may be a complex including resin and a metal oxide. The resin may include any one or more of Polycarbonate (PC), Polyamide (PA) and acrylonitrile-butadiene-styrene copolymer (ABS), and the metal oxide may include any one or more Mg, Cr, Cu, Ba, Fe, Ti and Al.

Referring to FIG. 9, the pattern groove 320 may be formed on one surface of the base 310. The pattern groove 320 may be formed by irradiating laser beams, e.g. Ultra Violet (UV) laser or excimer laser, to the one surface of the base 310. Heat generated during the forming of the groove may reduce the metal complex to the metal by breaking the chemical bonding of the metal complex and then form a metal seed on the pattern groove 320.

The pattern groove 320 may be formed on one surface of the base 310 provided in a curved surface or a bent surface. Since the groove is formed by irradiating the laser beams, the pattern 330 may have a variety of shapes regardless of the shape of the surface of the base 310.

Referring to FIG. 10, the pattern 330 may be formed in the pattern groove 320. The pattern 330 may be formed by metalizing the pattern groove 320 in which a metal sheet is exposed. For example, the pattern 330 may include copper or gold that is plated on the pattern groove 320. Further, for the oxidation prevention treatment, nickel may be plated on copper plating Referring to FIG. 11, a coating layer 340 may be laminated on one surface of the base 310 in which the pattern 330 is formed.

The coating layer 340 may be formed by being coated on the base 310 to protect the pattern 330 from an external impact or a contaminant.

Although not shown in the drawings, an inspection process may be further included, wherein the inspection process inspects whether the locking key 200 or the key box 100 manufactured according to the process shown in FIGS. 7 to 10 is normally operated or not. In addition, the inspection process may be performed prior to laminating the coating layer 340. This is because it may occur that the base material 300 is required to be repaired when the locking key 200 or the key box 100 does not pass the suitability requirement during the inspection process.

As is apparent from the above description, since the patterned locking key and the key box combined with the patterned locking key are manufactured by using a Laser Directing Structure (LDS) method, it may be possible to simplify the manufacturing process and to reduce the costs of the process.

By using the physical property and the frequency property of the LDS, the security of the locking key may be enhanced. Particularly, by changing the pattern of the key box and the pattern of the locking key, infinite combinations of the pattern are theoretically possible and thus the security may be greatly enhanced.

When a user loses the locking key, the user may use the key box module by only registering a new locking key without replacing the key box module.

By using the LDS method, the exterior of the locking key and the insertion hole of the key box may be manufactured in a circular shape.

Since an adhesion process is not used when forming the detection pattern on the base, it may be protected from vibrations and impacts, and durability may be improved.

Since the product is manufactured at high temperature in which the laser is used, the reliability of the product may be enhanced although the product is exposed to high temperatures.

Although some embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A locking key for changing a locked state by being inserted into a key box or changing an unlocked state by being removed from the key box, comprising:
   a first base including a non-conductive material and including a metal complex, in a single layer;
   a first pattern groove formed in the first base; and
   a first pattern provided in the first pattern groove and including a conductive material.

2. The locking key of claim 1, wherein, the first base comprises a resin including one or more of Polycarbonate (PC), Polyamide (PA) and acrylonitrile-butadiene-styrene copolymer (ABS), and a metal oxide including one or more of Mg, Cr, Cu, Ba, Fe, Ti and Al.

3. A key box for changing a locked state by a locking key being inserted into the key box or changing an unlocked state by the locking key being removed from the key box, comprising:
   an insertion hole into which the locking key is inserted;
   a second base laminated on one surface of the insertion hole, the second base including a metal complex, and the second base including a second pattern groove formed thereon; and
   a second pattern provided in the second pattern groove and including a conductive material.

4. The key box of claim 3, wherein, the second base comprises a resin including one or more of Polycarbonate (PC), Polyamide (PA) and acrylonitrile-butadiene-styrene copolymer (ABS), and a metal oxide including one or more of Mg, Cr, Cu, Ba, Fe, Ti and Al.

5. The key box of claim 3, further comprising a controller electrically connected to the second pattern, wherein the controller receives an input of a signal related to capacitance of the second pattern and determines whether the locking key is registered or not according to the signal.

6. A locking unit for changing a locked state by a locking key being inserted into a key box or changing an unlocked state by the locking key being removed from the key box, comprising:
   a first pattern including a conductive material provided on the locking key;
   wherein the key box is provided with an insertion hole into which the locking key is inserted, a second pattern including a conductive material, and a controller electrically connected to the second pattern,
   wherein the controller receives an input of a signal related to a capacitance or to a frequency between the first pattern and the second pattern, and determines whether the locking key is registered or not based on the signal,
   wherein, the locking key further comprises a first base including a metal complex and in which a first pattern groove is formed, wherein the first pattern is provided in the first pattern groove, and
   wherein the key box further comprises a second base laminated on one surface of the insertion hole, the second base including a metal complex, the second base including a second pattern groove formed thereon, wherein the second pattern is provided in the second pattern groove.

7. The locking unit of claim 6, further comprising a guide unit for guiding the locking key so that the locking key is inserted into the insertion hole in a predetermined direction.

8. The locking unit of claim 7, wherein, the guide unit comprises a guide protrusion protruded on one surface of any one of the locking key or the insertion hole, and the guide unit includes a guide groove recessed on one surface of the other of the locking key or the insertion hole, wherein the guide protrusion is guided along the guide groove.

9. The locking unit of claim 6, further comprising a stop unit for stopping the locking key so that the locking key is inserted into the insertion hole at a predetermined depth.

10. The locking unit of claim 6, wherein the second pattern is provided in a unique pattern and the first pattern is provided in a variety of patterns, wherein the locking unit has a unique frequency pattern when the locking key having any one of the plurality of first patterns is inserted into the key box having the second pattern.

11. The locking unit of claim 10, wherein the controller determines that the locking key corresponds to the key box when a frequency pattern, which is output when the locking key is inserted into the key box, is identical to the unique frequency pattern.

12. A manufacturing method of a locking unit for changing a locked state by
   a locking key being inserted into a key box or changing an unlocked state by the locking key being removed from the key box, comprising:
   manufacturing the locking key, including:
   providing a first base including a metal oxide;
   forming a first pattern groove by irradiating laser beams to one surface of the first base; and
   forming a first pattern including a conductive material by a plating process or a deposition process on the first pattern groove; and
   manufacturing the key box, including:
   providing a second base configured to include a metal oxide and provided with an insertion hole into which the locking key is inserted;
   forming a second pattern groove by irradiating laser beams to one surface of the second base; and
   forming a second pattern including a conductive material by a plating process or a deposition process on the second pattern groove,
   wherein the second pattern is provided in a unique pattern and the first pattern is provided in a variety of patterns.

* * * * *